United States Patent
Zi

(10) Patent No.: US 9,407,528 B2
(45) Date of Patent: Aug. 2, 2016

(54) METHOD, SYSTEM OF FAULT DETECTION FOR PSEUDO WIRES AND SERVICE PROVIDER EDGE ROUTER THEREOF

(75) Inventor: Kang Zi, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 1459 days.

(21) Appl. No.: 12/411,844

(22) Filed: Mar. 26, 2009

(65) Prior Publication Data

US 2009/0185495 A1 Jul. 23, 2009

Related U.S. Application Data

(63) Continuation of application No. PCT/CN2007/070728, filed on Sep. 19, 2007.

(30) Foreign Application Priority Data

Sep. 28, 2006 (CN) .......................... 2006 1 0062899

(51) Int. Cl.
*H04L 12/703* (2013.01)
*H04L 12/723* (2013.01)
*H04L 12/701* (2013.01)
(Continued)

(52) U.S. Cl.
CPC ............ *H04L 45/00* (2013.01); *H04L 12/2856* (2013.01); *H04L 45/28* (2013.01); *H04L 45/50* (2013.01); *H04L 43/0817* (2013.01)

(58) Field of Classification Search
USPC ......... 370/216–218, 228, 244, 248, 250, 252, 370/337, 389, 392, 401
See application file for complete search history.

(56) References Cited

U.S. PATENT DOCUMENTS

2005/0213513 A1* 9/2005 Ngo et al. ..................... 370/254
2006/0090008 A1 4/2006 Guichard et al.
(Continued)

FOREIGN PATENT DOCUMENTS

| CN | 1571390 | 1/2005 |
| CN | 1722726 | 1/2006 |

(Continued)

OTHER PUBLICATIONS

Jixiong Dong, Operation and Maintenance for Multi-Segmant Pseudo Wire, Oct. 10, 2005, pp. 1-14.*

(Continued)

*Primary Examiner* — Benjamin H Elliott, IV
*Assistant Examiner* — Prince A Mensah
(74) *Attorney, Agent, or Firm* — Staas & Halsey LLP

(57) ABSTRACT

The present invention discloses a method, system of fault detection for pseudo wires (PW) and a provider edge router (PE) thereof. The method includes the following. A remote PE receives, from a local PE, a first bonding relationship between a PW and an LSP of which the starting point is the local PE. After the remote PE detects a fault of the LSP, the remote PE determines a fault of the PW based on the detected fault of the LSP, a second bonding relationship between the PW and an LSP of which the starting point is the remote PE, and the received first bonding relationship, wherein the second bonding relationship is pre-configured at the remote PE. The method, system and PE of fault detection for a pseudo wire according to embodiments of the present invention can detect a fault of the PW precisely, ensuring the consistency of PW statuses detected by PEs at the two ends of the PW.

12 Claims, 5 Drawing Sheets

(51) Int. Cl.
*H04L 12/28* (2006.01)
*H04L 12/26* (2006.01)

(56) References Cited

U.S. PATENT DOCUMENTS

2006/0285500 A1* 12/2006 Booth et al. .................. 370/250
2008/0291921 A1* 11/2008 Du et al. .................. 370/395.53

FOREIGN PATENT DOCUMENTS

| EP | 1482694 | * | 1/2004 | ............. H04L 12/56 |
| EP | 1482694 A2 | | 12/2004 | |
| WO | WO-2004049644 | | 6/2004 | |

OTHER PUBLICATIONS

Martini, Pseudo Wire Setup and Maintenance Using the Label Distribution Protocol (LDP), Apr. 2006, pp. 1-33.*
Rahul Aggarwal, OAM Mechanisms in MPLS Layer 2 Transport Networks, Oct. 2004, IEEE, pp. 124-130.*
Dave Katz, Bidirectional Forwarding Detection, Oct. 2005, PW3 Working Group, pp. 1-44.*
Jixiong Dong, Operation and Maintenance for Multi-segment Pseudo Wire, Oct. 10, 2005, PW3 Working Group, pp. 1-14.*
Luca Martini, Pseudowire Setup and Maintenance Using the Label Distribution Protocol (LDP), Apr. 2006, PW3 Working Group, pp. 1-31.*
Dong, Jixiong, "Operation and Maintenence for Multi-Segment Pseudo Wire; draft-dong-pwe3-mspw-oam-00.txt," IETF Standard Working Draft, Internet Engineering Task Force, IETF, CH, Oct. 10, 2005.
Nadeau, Thomas, D., "Pseudo Wire (PW) OAM Message Mapping; draft-ietf-pwe3-oam-msg-map-03.txt," IETF Standard Working Draft, Internet Engineering Task Force, IETF, CH, vol. pwe3, No. 3, Sep. 1, 2005.
PCT International Preliminary Report on Patentability including an English translation of the PCT Written Opinion of the International Searching Authority for International application No. PCT/CN2007/070728, dated Jan. 3, 2008, 4 pgs.
European Patent Office Communication including the extended European search report, pursuant to Rule 62 EPC, the supplementary European search report (Art. 153(7) EPC) and the European search opinion for Application No. 07801121.0, dated Aug. 25, 2009, 9 pgs.
Martini, Luca, et al., "Pseudowire Set up and Maintenance Using the Label Distribution Protocol", Network Working Group, Jun. 2005, 35 pgs.
Katz, D., et al., "Bidirectional Forwarding Detection", Network Working Group, Oct. 2005, 44 pgs.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|0|   Notification (0x0001)     |        Message Length          |
+-+-+-+-+-+-+-+-+-+-+-+-+-+-+-+-+-+-+-+-+-+-+-+-+-+-+-+-+-+-+-+-+
|                          Message ID                            |
+-+-+-+-+-+-+-+-+-+-+-+-+-+-+-+-+-+-+-+-+-+-+-+-+-+-+-+-+-+-+-+-+
|                         Status (TLV)                           |
+-+-+-+-+-+-+-+-+-+-+-+-+-+-+-+-+-+-+-+-+-+-+-+-+-+-+-+-+-+-+-+-+
|                         LSP OAM TLV                            |
+-+-+-+-+-+-+-+-+-+-+-+-+-+-+-+-+-+-+-+-+-+-+-+-+-+-+-+-+-+-+-+-+
|                         PWId FEC TLV 1                         |
+-+-+-+-+-+-+-+-+-+-+-+-+-+-+-+-+-+-+-+-+-+-+-+-+-+-+-+-+-+-+-+-+
|                         PWId FEC TLV 2                         |
+-+-+-+-+-+-+-+-+-+-+-+-+-+-+-+-+-+-+-+-+-+-+-+-+-+-+-+-+-+-+-+-+
|                             ......                             |
+-+-+-+-+-+-+-+-+-+-+-+-+-+-+-+-+-+-+-+-+-+-+-+-+-+-+-+-+-+-+-+-+
|                         PWId FEC TLV n                         |
+-+-+-+-+-+-+-+-+-+-+-+-+-+-+-+-+-+-+-+-+-+-+-+-+-+-+-+-+-+-+-+-+
```

Fig. 5

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|1|0|      LSP OAM TLV          |            Length              |
+-+-+-+-+-+-+-+-+-+-+-+-+-+-+-+-+-+-+-+-+-+-+-+-+-+-+-+-+-+-+-+-+
|                    AM Type (BFD or MPLS OAM)                   |
+-+-+-+-+-+-+-+-+-+-+-+-+-+-+-+-+-+-+-+-+-+-+-+-+-+-+-+-+-+-+-+-+
|    My Discriminator in case of BFD, LSP ID in case of MPLS OAM |
+-+-+-+-+-+-+-+-+-+-+-+-+-+-+-+-+-+-+-+-+-+-+-+-+-+-+-+-+-+-+-+-+
```

Fig. 6

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|1|0|  a LSP-PW relationship TLV  |            Length            |
+-+-+-+-+-+-+-+-+-+-+-+-+-+-+-+-+-+-+-+-+-+-+-+-+-+-+-+-+-+-+-+-+
|                  OAM Type (BFD or MPLS OAM)                    |
+-+-+-+-+-+-+-+-+-+-+-+-+-+-+-+-+-+-+-+-+-+-+-+-+-+-+-+-+-+-+-+-+
|   My Discriminator in case of BFD, LSP ID in case of MPLS OAM  |
+-+-+-+-+-+-+-+-+-+-+-+-+-+-+-+-+-+-+-+-+-+-+-+-+-+-+-+-+-+-+-+-+
|          PW Type 1            |           PW Number            |
+-+-+-+-+-+-+-+-+-+-+-+-+-+-+-+-+-+-+-+-+-+-+-+-+-+-+-+-+-+-+-+-+
|                            PW ID 1                             |
+-+-+-+-+-+-+-+-+-+-+-+-+-+-+-+-+-+-+-+-+-+-+-+-+-+-+-+-+-+-+-+-+
|                            PW ID 2                             |
+-+-+-+-+-+-+-+-+-+-+-+-+-+-+-+-+-+-+-+-+-+-+-+-+-+-+-+-+-+-+-+-+
|                            ......                              |
+-+-+-+-+-+-+-+-+-+-+-+-+-+-+-+-+-+-+-+-+-+-+-+-+-+-+-+-+-+-+-+-+
|                            PW ID n                             |
+-+-+-+-+-+-+-+-+-+-+-+-+-+-+-+-+-+-+-+-+-+-+-+-+-+-+-+-+-+-+-+-+
|          PW Type 2            |           PW Number            |
+-+-+-+-+-+-+-+-+-+-+-+-+-+-+-+-+-+-+-+-+-+-+-+-+-+-+-+-+-+-+-+-+
|                            PW ID 1                             |
+-+-+-+-+-+-+-+-+-+-+-+-+-+-+-+-+-+-+-+-+-+-+-+-+-+-+-+-+-+-+-+-+
|                            ......                              |
+-+-+-+-+-+-+-+-+-+-+-+-+-+-+-+-+-+-+-+-+-+-+-+-+-+-+-+-+-+-+-+-+
|                            PW ID n                             |
+-+-+-+-+-+-+-+-+-+-+-+-+-+-+-+-+-+-+-+-+-+-+-+-+-+-+-+-+-+-+-+-+
```

Fig. 7

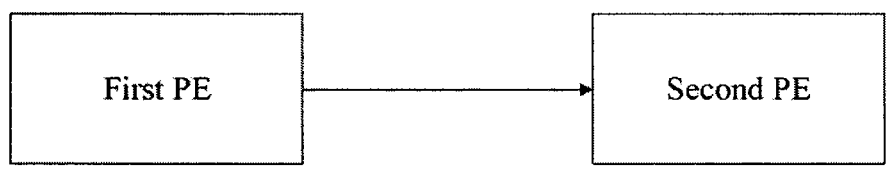

Fig. 8

METHOD, SYSTEM OF FAULT DETECTION FOR PSEUDO WIRES AND SERVICE PROVIDER EDGE ROUTER THEREOF

CROSS-REFERENCE TO RELATED APPLICATIONS

This application is a continuation of International Application No. PCT/CN2007/070728, filed Sep. 19, 2007, which claims the benefit of Chinese Application No. 200610062899.5, filed Sep. 28, 2006, both of which are hereby incorporated by reference in their entireties.

FIELD

The present disclosure relates to network communication field, and more specifically, to a method, system of fault detection for pseudo wires and a provider edge router thereof.

BACKGROUND

The statements in this section merely provide background information related to the present disclosure and may not constitute prior art.

Virtual Private Network (VPN) is a technology that relies on Internet Service Provider (ISP) and Network Service Provider (NSP) to establish a private data communication network in a public network. The VPN can be categorized into Layer-2 VPN (L2VPN) and Layer-3 VPN (L3VPN), etc.

The L2VPN provides a layer-2 VPN service based on Packet Switched Network, such as MultiProtocol Label Switching (MPLS) network.

FIG. 1 illustrates a conventional networking schematic for L2VPN. A Customer Edge (CE) device has an interface to connect to the ISP network directly. PE is an edge device in ISP network, connecting directly to CE device. Service Provider (P) is a backbone router in ISP network. It does not connect to CE directly. In FIG. 1, a Label Switching Path (LSP) is a unidirectional virtual connection between two PEs. A Pseudo Wire (PW) is a bidirectional virtual connection between two PEs, transmitting frames between two PEs. PE utilizes signaling to set up and maintain PW. The status information of a PW is maintained by PEs located at two ends of the PW.

In a related art, there are two approaches to detect a fault of the PW in L2VPN.

One is to employ a conventional Bidirectional Forwarding Detection (BFD) technique or an MPLS Operation Administration and Maintenance (MPLS OAM) to detect a fault of the PW. However, when the number of PWs is large, devices will be overloaded when operating BFD or MPLS OAM. Moreover, the messages sent for BFD or MPLS OAM may take up a huge amount of network bandwidth. Consequently, the shortcoming of this approach is that when the number of PWs is large, the processing overhead of the device and the network bandwidth occupation is huge.

Another approach is to detect a fault of the LSP first, using BFD or MPLS OAM. The detection result is then used for detection of a fault of the PW. However, in this approach, since it can not be ascertained which PW is associated with LSP after a fault of the LSP is detected, this approach is not able to detect fault of the PW correctly. As an example, FIG. 2 illustrates relationship between PWs and LSPs. CE1, CE2, CE3 and CE4 all belong to a L2VPN. There are two LSPs from PE1 to PE2. The LSP that goes through P1 is defined as LSP1. The LSP that goes through P2 is defined as LSP2.

There are also two LSPs from PE2 to PE1. The LSP that goes through P1 is defined as LSP3. The LSP that goes through P2 is defined as LSP4.

Two PWs are established between PE1 and PE2. PW1 bears service between CE1 and CE3. PW2 bears service between CE2 and CE4. The PSN tunnel selected by PW1 is LSP1 and LSP3, which means that both directions pass through P1. The PSN tunnel selected by PW2 is LSP2 and LSP3, which means that the PE1→PE2 direction passes through P2 while the PE2→PE1 direction passes through P1. Two directions go through different P devices. At a PE, only the LSP of which the starting point is the PE can be found to be associated with PW. For instance, for PW2, it can only be determined at PE1 that PW2 is associated with LSP2. And, it can only be determined at PE2 that PE2 is associated with LSP3. Since the PEs at two ends of PW can only determine a bonding relationship between PW and LSP in a one way direction, detection results obtained at PEs of two ends may turn out to be inconsistent with each other when detecting a fault of the PW.

To better illustrate the problem, take PW2 as an example again. When a fault is detected at LSP2, since PW2 is determined, at PE1, to be associated with LSP2, the PE1 may determine that a fault occurs at PW2. However, PW2 is determined, at PE2, to be associated with LSP3. And since no fault occurs at LSP3, PE2 does not consider PW2 as faulty. Therefore, the fault detection results at PE1 and PE2 are different.

SUMMARY

In view of this, a method of fault detection for pseudo wires in L2VPN is provided according to one embodiment of the present disclosure. The method can detect a fault of the PW precisely and ensure the consistency of PW statuses detected at PEs of two ends of the PW.

A system of fault detection for pseudo wires in L2VPN is provided according to one embodiment of the present disclosure. The system can detect a fault of the PW precisely and ensure the consistency of PW statuses detected at PEs of two ends of the PW.

A PE is also provided according to one embodiment of the present disclosure. The PE can detect a fault of the PW precisely.

The technical solutions according to the embodiments of the present disclosure are presented as follows.

The method of fault detection for pseudo wires includes:
receiving, by a remote service provider edge router (PE) from a local PE, a first bonding relationship between a PW and a label switching path (LSP) of which the starting point is the local PE;
detecting a fault of the LSP by the remote PE; and determining a fault of the PW based on the detected fault of the LSP, a second bonding relationship between the PW and an LSP of which the starting point is the remote PE, and the received first bonding relationship, wherein the second bonding relationship is pre-configured at the remote PE.

The system of fault detection for pseudo wires includes:
a first PE, adapted to send, to a second PE, a first bonding relationship between a PW and an LSP of which the starting point is the first PE;
the second PE, adapted to receive the first bonding relationship, detect a fault of the LSP, determine a fault of the PW based on the detected fault of the LSP, the received first bonding relationship, a pre-configured second bonding relationship between the PW and an LSP of which the starting point is the second PE.

The PE includes:
   a bonding relationship receiving module, adapted to receive a bonding relationship sent from a remote PE;
   a fault of the LSP detection module, adapted to detect a fault of the LSP; and
   a fault of the PW detection module, adapted to determine a fault of the PW based on the detected fault of the LSP, a pre-configured bonding relationship between a PW and an LSP of which the starting point is the PE, and the bonding relationship received by the bonding relationship receiving module.

Therefore, according to the method, system of fault detection for pseudo wires and PE thereof provided by embodiments of the present disclosure, a conventional fault of the LSP detection mechanism is used. Moreover, a local PE may send, to a remote PE, a bonding relationship between a PW and an LSP of which the starting point is the local PE. The remote PE may determine a fault of the PW based on the received bonding relationship, and a pre-stored bonding relationship between the PW and an LSP of which the starting point is the remote PE. Consequently, the present disclosure utilizes a fault of the LSP detection mechanism and the bonding relationships between PW and LSP to precisely detect a fault of the PW, ensuring thereby the consistency of PW statuses detected by PEs at two ends of the PW.

BRIEF DESCRIPTION OF THE DRAWINGS

The disclosures will become more fully understood from the detailed description given herein below for illustration only, and thus is not limitative of the disclosure, and wherein:

FIG. 5 is a structure of an LDP notification message according to one embodiment of the present disclosure;

FIG. 6 is a structure of a LSP OAM TLV field according to one embodiment of the present disclosure;

FIG. 7 is a structure of a PW-LSP relationship TLV field in an LDP notification message according to one embodiment of the present disclosure;

FIG. 8 is a block diagram of a system for detecting fault of the PW according to one embodiment of the present disclosure.

DETAILED DESCRIPTION

The following description is merely exemplary in nature and is not intended to limit the present disclosure, application, or uses.

The purpose, technical solutions and advantages concerning the embodiments of the present disclosure will become more readily appreciated by reference to the following description of the embodiments, when taken in conjunction with the accompanying drawings.

Figure 1:
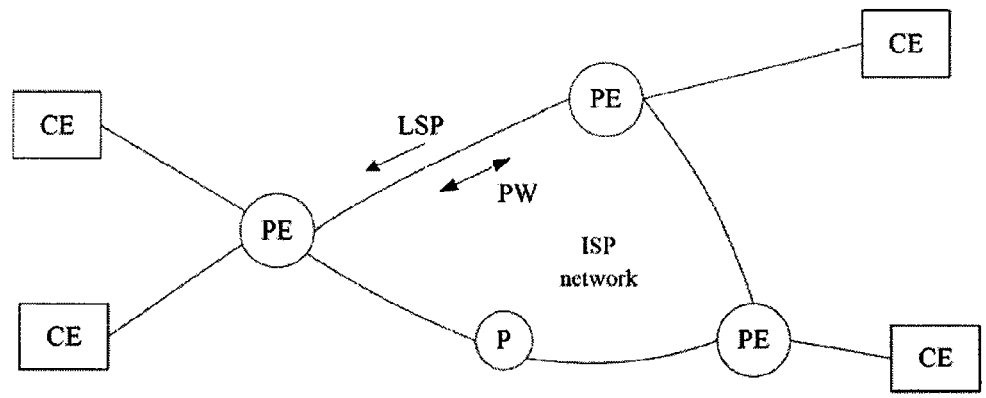
FIG. 1 is a conventional architecture of L2VPN networking.
Figure 2:
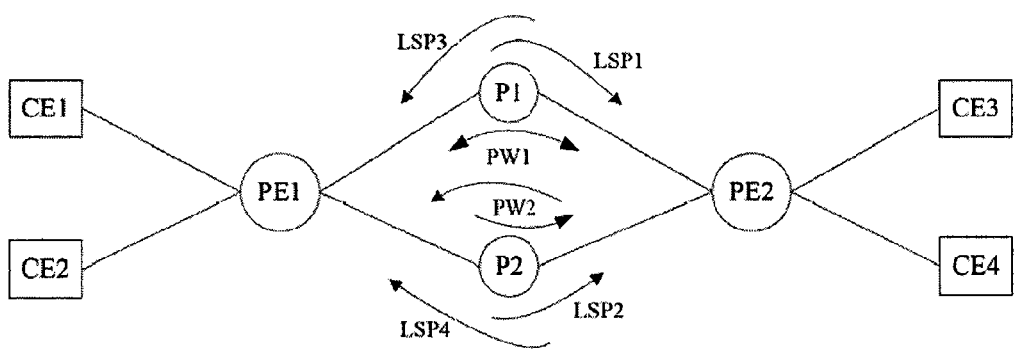
FIG. 2 illustrates relationship between PWs and LSPs in L2VPN.
Figure 3:
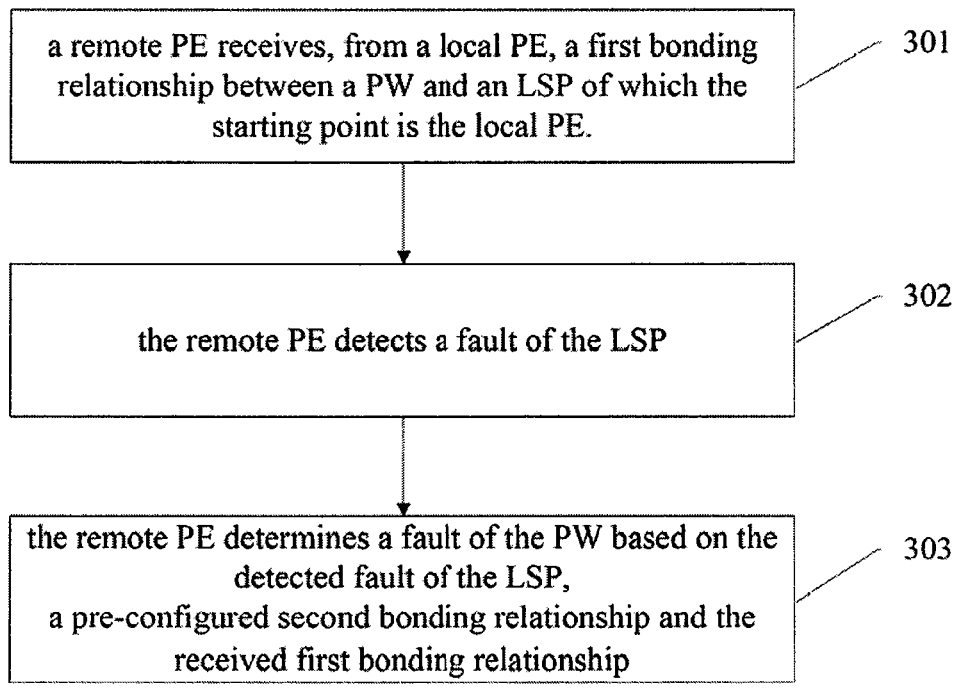
FIG. 3 is a flowchart of a method for detecting fault of the PW according to one embodiment of the present disclosure.

FIG. 3 is a flowchart of a method for detecting a fault of the PW according to one embodiment of the present disclosure. The method includes the following.

301: A remote PE receives, from a local PE, a first bonding relationship between a PW and an LSP of which the starting point is the local PE.

302: The remote PE detects a fault of the LSP.

303: The remote PE determines a fault of the PW based on the detected fault of the LSP, a pre-configured second bonding relationship between the PW and an LSP of which the starting point is the remote PE, and the received first bonding relationship.

Figure 4:
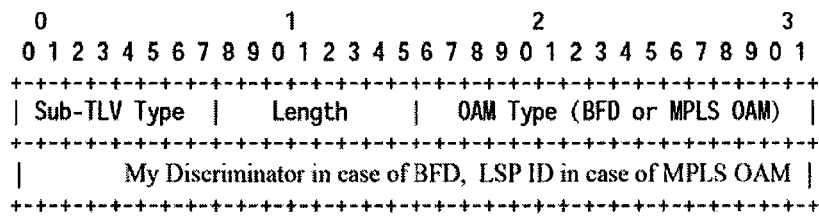
FIG. 4 is a structure of a PW Interface Parameters TLV field according to one embodiment of the present disclosure.

In the above 301, if a fault of the LSP detection mechanism is already operating before the PW sets up, the local PE may send the first bonding relationship to the remote PE when the PW is being set up. Specifically, when the PW is being set up, the first bonding relationship may be carried in a PW Interface Parameters Type-Length-Value (TLV) field. In particular, the LSP information is added in the PW Interface Parameters TLV field. Since a label mapping message itself contains information about PW, this information plus the LSP information added in the PW Interface Parameters TLV field may reflect the first bonding relationship between PW and LSP. FIG. 4 is a structure of a PW Interface Parameters TLV field according to one embodiment of the present disclosure.

Sub-TLV Type is used to denote TLV type.

Length is used to denote the length of message in a unit of byte.

OAM Type (OAM Type) is used to denote an OAM type. The present disclosure may use a fault of the LSP detection mechanism such as BFD or MPLS OAM, etc.

My Discriminator is a unique non-zero discriminator value generated by a transmitting system, which is used to distinguish among several BFD sessions.

LSP ID is used to uniquely represent an LSP.

In the above 301, if the fault of the LSP detection mechanism is just starting to run after the PW is set up, the local PE may send a notification message of Label Distribution Protocol (LDP) carrying the first bonding relationship to the remote PE. FIG. 5 is a structure of an LDP notification message according to one embodiment of the present disclosure.

In FIG. 5, a PW ID forwarding Equivalence Class TLV (PWld FEC TLV) field contains PW information, which is defined in protocol already and is omitted herein for brevity. The LSP OAM TLV field contains LSP information. FIG. 6 is a structure of a LSP OAM TLV field according to one embodiment of the present disclosure.

The content shown in FIG. 6 is similar to that in FIG. 4, which is omitted herein for brevity.

In one embodiment, the local PE just need to send the first bonding relationship via the LDP notification message to the remote PE. The specific message format is not so limited. Alternatives can be conceived by those skilled in the art. For instance, a PW-LSP relationship TLV field can be inserted in the LDP notification message. This PW-LSP relationship TLV field may be dedicated to carry bonding relationship between PW and LSP. FIG. 7 is a structure of a PW-LSP relationship TLV field in an LDP notification message according to one embodiment of the present disclosure.

At 302, the remote PE may detect a fault of the LSP in accordance with the conventional BDF protocol or MPLS OAM.

At 303, the implementation of the remote PE determining the fault of the PW is detailed below. The LSP where a fault is detected at 302 is used as an index for querying the second bonding relationship and the first bonding relationship. When it is found that a faulty LSP exists according to the second bonding relationship and the first bonding relationship, it is determined that a fault occurs at the PW corresponding to the LSP. After all the faulty LSPs are polled, all the faulty PW's can be determined.

A system for detecting fault of the PW is also provided according to one embodiment of the present disclosure. FIG. 8 is a block diagram of a system for detecting fault of the PW according to one embodiment of the present disclosure. The system includes:

a first PE, adapted to send, to a second PE, a first bonding relationship between a PW and an LSP of which the starting point is the first PE; and the second PE, adapted to receive the first bonding relationship, detect a fault of the LSP, determine a fault of the PW based on the detected fault of the LSP, the received first bonding relationship, a pre-configured second bonding relationship between the PW and an LSP of which the starting point is the second PE.

The first bonding relationship may be carried in a label mapping message or in an LDP notification message.

Figure 9:
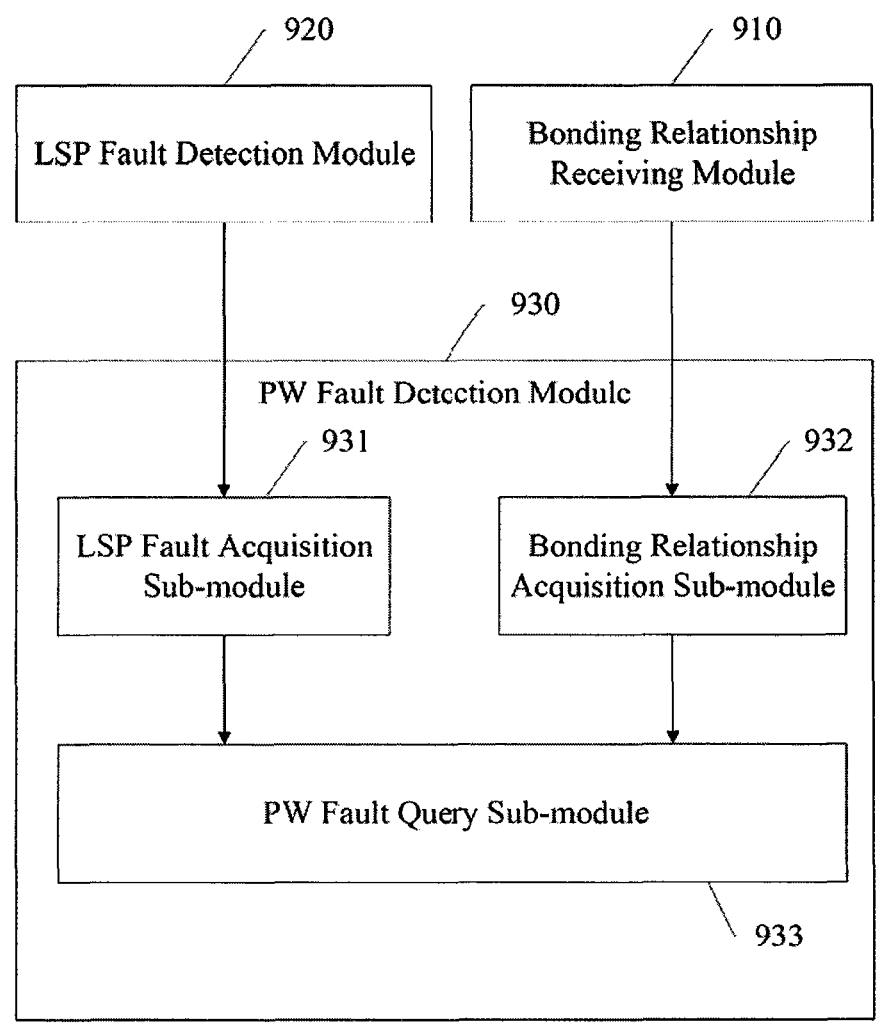
FIG. 9 illustrates a block diagram of PE according to one embodiment of the present disclosure.

A PE is also provided according to one embodiment of the present disclosure. FIG. 9 illustrates a block diagram of a PE according to one embodiment of the present disclosure. The PE includes:

a bonding relationship receiving module 910, adapted to receive a bonding relationship sent from a remote PE;

a fault of the LSP detection module 920, adapted to detect a fault of the LSP; and a fault of the PW detection module 930, adapted to determine a fault of the PW based on the detected fault of the LSP, a pre-configured bonding relationship between the PW and an LSP of which the starting point is the PE, and the bonding relationship received by the bonding relationship receiving module 910.

The fault of the PW detection module 930 may include:

a fault of the LSP acquisition sub-module 931, adapted to acquire a fault of the LSP from the fault of the LSP detection module 920;

a bonding relationship acquisition sub-module 932, adapted to acquire the pre-configured bonding relationship between the PW and the LSP of which the starting point is the PE and acquire the bonding relationship received by the bonding relationship receiving module 910; and a fault of the PW query sub-module 933, adapted to use the faulty LSP which is acquired by the fault of the LSP acquisition sub-module 931 as an index to query the bonding relationship obtained by the bonding relationship acquisition sub-module 932 and find the faulty PW.

Therefore, according to the method, system and PE for detecting fault of the PW provided by embodiments of the present disclosure, a local PE may send, to a remote PE, a bonding relationship between a PW and an LSP of which the starting point is the local PE. The remote PE may determine a fault of the PW based on the received bonding relationship, a pre-stored bonding relationship between the PW and an LSP of which the starting point is the remote PE, and the detected faulty LSP. The method, system and PE according to embodiments of the present disclosure can detect a fault of the PW precisely by using a fault of the LSP detection mechanism and bonding relationships between PW and LSP, and ensuring thereby the PW statuses detected by PEs at the two ends of the PW to be consistent with each other.

The foregoing are merely exemplary embodiments of the present disclosure, while the scope of the present disclosure is not so limited. Any variations or equivalents can be readily appreciated by those skilled in the art. These variations or equivalents shall be construed as fall within the scope of the present disclosure.

What is claimed is:

1. A method of fault detection, comprising:
receiving, by a first service provider edge router (PE), a first bonding relationship from a second PE, wherein the first bonding relationship is between a pseudo wire PW and a first label switching path (LSP) that is from the second PE to the first PE, the first PE is an ending point of the first LSP, the second PE is a starting point of the first LSP and the second PE is coupled with a router different from the first PE;
detecting, by the first PE, a fault of the first LSP by the first PE;
and determining, by the first PE, a fault of the PW based on:
the detected fault of the first LSP, a second bonding relationship between the PW and a second LSP of which the starting point is the first PE, wherein the second bonding relationship is pre-configured at the first PE, and the received first bonding relationship.

2. The method of claim 1, wherein the first bonding relationship is carried in a label mapping message or in a Label Distribution Protocol (LDP) notification message.

3. A method of fault detection, comprising:
receiving, by a first service provider edge router (PE) from a second PE, a first bonding relationship between a pseudo wire (PW) and a first label switching path (LSP) of which a starting point is the second PE, wherein the direction of the first LSP is from the second PE to the first PE, the second PE is the starting point of the first LSP and the first PE is an ending point of the first LSP;
detecting a fault of the first LSP by the first PE;
and determining a fault of the PW based on:
the detected fault of the first LSP,
a second bonding relationship between the PW and a second LSP of which the starting point is the first PE, wherein the second bonding relationship is pre-configured at the first PE, and
the first bonding relationship, wherein the first bonding relationship is carried in a label mapping message or in a Label Distribution Protocol (LDP) notification message, wherein when the first bonding relationship is carried in the label mapping message, the first bonding relationship is carried in a PW Interface Parameters Type-Length-Value (PW Interface Parameters TLV) field;
and wherein the first bonding relationship is carried in the LDP notification message, the first bonding relationship is carried in an LSP Operation Administration and Maintenance Type-Length-Value(OAM TLV) field; or an LSP-PW relationship TLV field.

4. The method of claim 2, wherein,
if an LSP fault detection mechanism is already running when the PW is being set up, the second PE sends the label mapping message carrying the first bonding relationship to the first PE;
if the LSP fault detection mechanism is not running when the PW is being set up, the second PE sends the LDP notification message carrying the first bonding relationship to the first PE.

5. The method of claim 1, characterized in that, detecting the fault of the first LSP by first PE comprises:
detecting the fault of the first LSP by running a bidirectional forwarding detection (BFD) protocol or a Multi-Protocol Label Switching (MPLS) OAM protocol.

6. A system of fault detection for pseudo wires (PW), comprising:
a first provider edge router (PE), adapted to send, to a second PE, a first bonding relationship between a PW and a first label switching path (LSP) of which a starting point is the first PE, wherein direction of the first LSP is from the first PE to the second PE, the first PE is coupled with a router different from the second PE;
and the second PE, adapted to receive the first bonding relationship, detect a fault of the first LSP, determine a fault of the PW based on the detected fault of the first LSP, the received first bonding relationship, and a pre-configured second bonding relationship between the PW and a second LSP of which the starting point is the second PE.

7. The system of claim 6, wherein the first bonding relationship is carried in a label mapping message or in a Label Distribution Protocol (LDP notification message.

8. A provider edge router (PE), comprising:
a bonding relationship receiving module, adapted to receive a bonding relationship sent from a remote PE, wherein the received bonding relationship is a bonding relationship between a pseudo wire (PW) and a first label switching path (LSP) of which a starting point is the remote PE, direction of the first LSP is from the remote PE to the PE and the PE is coupled with a router different from the remote PE;
an LSP fault detection module, adapted to detect a fault of the first LSP;
and a PW fault detection module, adapted to determine a fault of the PW base on:
the detected fault of the first LSP,
a pre-configured bonding relationship between the PW and a second LSP of which the starting point is the PE, and the bonding relationship received by the bonding relationship receiving module.

9. The PE of claim 8, wherein the PW fault detection module comprises:
an LSP fault acquisition sub-module, adapted to acquire the fault of the first LSP from the LSP fault detection module;
a bonding relationship acquisition sub-module, adapted to acquire the pre-configured bonding relationship between the PW and the second LSP and acquire the bonding relationship received by the bonding relationship receiving module;
and a PW fault query sub-module, adapted to use the faulty LSP which is acquired by the LSP fault acquisition sub-module as an index to query the bonding relationship obtained by the bonding relationship acquisition sub-module and find the faulty PW.

10. The method of claim 2, wherein when the first bonding relationship is carried in the label mapping message, the first bonding relationship is carried in a PW Interface Parameters Type-Length-Value (PW Interface Parameters TLV) field;
and when the first bonding relationship is carried in the LDP notification message, the first bonding relationship is carried in an LSP Operation Administration and Maintenance Type-Length-Value (OAM TLV) field; or an LSP-PW relationship TLV field.

11. The method of claim 1, wherein determining the fault of the PW comprises:
querying the second bonding relationship and the first bonding relationship using the faulty LSP as an index;
and obtaining the faulty PW.

12. A non-transitory computer-readable storage medium with an executable program stored thereon, wherein the program instructs a processor in a provider edge router (PE) to:
receive a first bonding relationship from another PE, wherein the first bonding relationship is between a pseudo wire PW and a first label switching path (LSP) that is from the another PE to the PE, the another PE is a starting point of the first LSP, the PE is an ending point of the first LSP and the PE is coupled with a router different from the first PE;
detecting a fault of the first LSP;
and determining a fault of the PW based on the detected fault of the first LSP, a second bonding relationship between the PW and a second LSP of which the starting point is the first PE, wherein the second bonding relationship is pre-configured at the first PE, and the received first bonding relationship.

* * * * *